United States Patent
Yamauchi et al.

(10) Patent No.: US 7,142,270 B2
(45) Date of Patent: Nov. 28, 2006

(54) LIQUID CRYSTAL DISPLAY DEVICE VIEWABLE FROM BOTH SIDES USING INCIDENT LIGHT FROM ONLY ONE OF THE SIDES, AND USING ONLY ONE REFLECTION-POLARIZING PLATE ON ONE OF THE SIDES

(75) Inventors: Naofumi Yamauchi, Chiba (JP); Makoto Kurihara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/634,450

(22) Filed: Aug. 5, 2003

(65) Prior Publication Data
US 2004/0109112 A1    Jun. 10, 2004

(30) Foreign Application Priority Data
Aug. 9, 2002  (JP)  ............................ 2002-233372
Jul. 30, 2003  (JP)  ............................ 2003-203903

(51) Int. Cl.
*G02F 1/1335* (2006.01)
(52) U.S. Cl. .................... 349/113; 349/96; 349/98; 349/114; 349/115
(58) Field of Classification Search ................ 349/96, 349/113, 114, 115, 98
See application file for complete search history.

(56) References Cited

U.S. PATENT DOCUMENTS

| | | | |
|---|---|---|---|
| 6,542,208 B1 * | 4/2003 | Akiyama | 349/96 |
| 6,809,782 B1 * | 10/2004 | Kawamoto et al. | 349/96 |
| 2002/0089622 A1 * | 7/2002 | Kuroiwa et al. | 349/96 |
| 2004/0027513 A1 * | 2/2004 | Yuuki et al. | 349/96 |

* cited by examiner

*Primary Examiner*—Andrew Schechter
*Assistant Examiner*—(Nancy) Thanh-Nhan P. Nguyen
(74) *Attorney, Agent, or Firm*—Adams & Wilks

(57) ABSTRACT

To realize at low cost a liquid crystal display device which is thin and in which display on a single liquid crystal panel can be viewed in both ways, from the front and from the back. The liquid crystal display device includes a liquid crystal panel in which a liquid crystal layer is interposed between opposing substrates, and a polarizer and a reflection-polarizing plate provided so as to interpose the liquid crystal panel therebetween. The reflection axis of the reflection-polarizing plate is set in the same direction as a polarization direction of light that exits the liquid crystal panel after its polarization direction is changed in the liquid crystal layer, or a polarization direction of light that exits the liquid crystal panel without being changed in polarization direction in the liquid crystal layer. Due to this arrangement, a liquid crystal display device can be provided which is thin and capable of displaying on both the front side and the back side.

16 Claims, 4 Drawing Sheets

LIQUID CRYSTAL DISPLAY DEVICE VIEWABLE FROM BOTH SIDES USING INCIDENT LIGHT FROM ONLY ONE OF THE SIDES, AND USING ONLY ONE REFLECTION-POLARIZING PLATE ON ONE OF THE SIDES

BACKGROUND OF THE INVENTION

The present invention relates to a liquid crystal display device which is used, for example, in timepieces, cellular phones, audio systems, and other electronic equipment and which allows a viewer to view a display from both the front and the back.

In recent years, liquid crystal display devices that are thin and lightweight have been widely used in portable equipment and the like. In particular, cellular phones which are required to be small in size and weight almost always employ such liquid crystal display devices. However, liquid crystal display devices are of the light-receiving type and cannot provide enough visibility in dark places, which is one of the requirements in cellular phones. This problem is often solved by installing an illumination device on the front or back of the liquid crystal display device. In general, the former illumination device is called a frontlight and the latter is called a backlight. A schematic sectional view of a front light type display device is shown in FIG. 5. A front light shown in the drawing has a light source 14 and an optical waveguide 15. Light from the light source 14 is guided downward (toward a liquid crystal display panel 1) by the optical waveguide 15 and is reflected by a reflector 16, which is provided on the back of the liquid crystal panel 1. In this way, information displayed on the liquid crystal panel 1 is made visible to a viewer. Light from the outside (external light) also enters the liquid crystal panel through the optical waveguide 15 and makes the display on the liquid crystal panel 1 visible in a similar manner. On the other hand, a back light type display device is outlined in FIG. 6. A backlight in th drawing has a light source 14 and an optical waveguide 17, and is placed below a liquid crystal panel 1. Light from the light source 14 of the backlight is reflected upward via the optical waveguide 17 to illuminate the liquid crystal panel 1. Display is thus made visible to a viewer.

As described, the optical waveguide 15 of the front light is structured to transmit light reflected by the reflector 16, whereas the optical waveguide 17 of the back light is merely capable of diffuse reflection of light and not transmission of light.

Current cellular phones have a folding structure and this has prompted employment of a sub display device in addition to a main display device in order to enable a cellular phone user to see his/her cellular phone display information such as time and reception of a call even when the phone is folded. The sub display device makes it possible for a viewer to view from the back side of the main display device. To give an example, FIG. 7 shows a structure which has a combination of a frontlight and a liquid crystal panel 1 as a main display and a combination of a backlight and a liquid crystal panel 18 as a sub display. A semi-transmissive plate 19 is provided between an optical waveguide 17 and the liquid crystal panel 18 of the backlight if necessary.

Furthermore, a structure of a single liquid crystal panel, which can be viewed both from the front side and from the back side, is known in a published application "JP-A No. 2000-132189". In this application, a first reflector is put on a part area of the front side of the liquid crystal panel. So, this area is only observed from the back side.

The conventional structure shown in FIG. 7 needs another display device for the sub display in addition to a main display device. With the structure where the main display device and the sub display device overlap each other, the total thickness of the liquid crystal display device is large and the cellular phone or other device that has this liquid crystal device that has this liquid crystal display device is accordingly thick. Another problem of this structure relates to cost because a driver circuit and an illumination device for the sub display device are necessary aside from those for the main display device.

As described, the conventional structure cannot provide a thin and inexpensive liquid crystal display device that is capable of main display and sub display.

SUMMARY OF THE INVENTION

The present invention has been made in view of the above, and an object of the present invention is therefore to provide at low cost a liquid crystal display device which is thin and capable of displaying on both the front side and the back side.

A liquid crystal display device of the present invention is structured such that display on a single liquid crystal panel can be viewed in both ways, from the front and from the back. That is, the structure of the liquid crystal display device of the present invention has a liquid crystal panel in which a liquid crystal layer is interposed between opposing substrates, a polarizer provided on one side of the liquid crystal panel, and a reflection-polarizing plate provided on the other side of the liquid crystal panel to reflect a polarization component polarized in a specific direction while other polarization components are transmitted. The reflection axis of the reflection-polarizing plate is set in the same direction as a polarization direction of light that exits the liquid crystal panel after its polarization direction is changed in the liquid crystal layer, or a polarization direction of light that exits the liquid crystal panel without being changed in polarization direction in the liquid crystal layer.

The liquid crystal display device of the present invention also has a driver circuit for supplying the liquid crystal panel with a signal to be applied to the display panel after the signal is subjected to conversion processing in accordance with from which side of the polarizer side and the reflection-polarizing plate side the liquid crystal panel is to be viewed. This makes displayed text information visible from either side.

DETAILED DESCRIPTION OF THE PREFERRED EMBODIMENTS

Figure 1A:
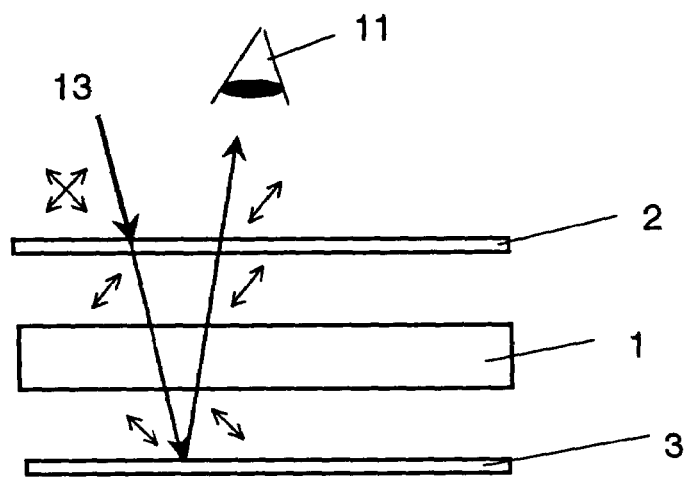
FIGS. 1A and 1B are sectional views each schematically showing a structure of a liquid crystal display device according to the present invention.

A liquid crystal display device of the present invention is structured such that a polarizer and a reflection-polarizing plate sandwich a liquid crystal panel in which a liquid crystal layer is interposed between opposing substrates. The liquid crystal layer has a portion where the polarization direction of incident light is changed before the light exits and a portion where incident light exits without changing its polarization direction. These portions are given different brightness to make display on the liquid crystal panel recognizable as an image. The reflection-polarizing plate has a function of reflecting a polarization component polarized in a specific direction and transmitting the rest. The reflection axis of the reflection-polarizing plate is set in the same direction as the polarization direction of light chosen out of components of light that enters the liquid crystal panel through the polarizer, a component (light) that exits the liquid crystal layer, or a component (light) that exits the liquid crystal panel without being changed in polarization direction in the liquid crystal layer. This structure makes it possible to view display both from the polarizer side (a first view point) and from the reflection-polarizing plate side (a second view point) only with light that enters the liquid crystal panel from the polarizer side. In short, double-sided display of a single liquid crystal panel is made possible. In particular, when the first viewpoint is at a position of specular reflection with respect to the angle of incident of incident light, the brightest display can be viewed from the first viewpoint. In addition, the brightest display can be viewed from the second viewpoint when the second viewpoint is on a straight line that is extended from the angle of incident of incident light.

Light is prevented from entering a dark region (a portion where light from the reflection-polarizing plate toward the second view point side does not exit) of the liquid crystal panel from the second viewpoint side, thereby improving the visibility from the second view point side. For instance, the visibility from the second viewpoint side is improved by placing a second polarizer, whose absorption axis is in the same direction as the reflection axis of the reflection-polarizing plate, outside the reflection-polarizing plate, and thus eliminating light that is reflected toward the second viewpoint side in a dark region of the reflection-polarizing plate.

A diffusion layer is provided between the liquid crystal panel and the reflection-polarizing plate. With this structure, light scattered by the diffusion layer reaches each viewpoint, so that the viewing angle is widened at each viewpoint.

The diffusion layer between the liquid crystal panel and the reflection-polarizing plate may be replaced by a directional diffusion layer. The directional diffusion layer is set such that scattered light has directivity in a specific direction.

A driver circuit, which supplies the liquid crystal panel with a signal to be applied to the display panel after the signal is subjected to conversion processing in accordance with from which side of the first viewpoint side and the second viewpoint side the liquid crystal panel is to be viewed, makes it possible to freely switch between front side display and back side display. For example, mirror writing or upside-down letters can be converted into normal letters by such processing as changing the signal scanning direction. It is also possible to reverse negative display and positive display. Therefore, the display device can be set to show a viewer the same image (e.g., positive display of a normal letter) from both the front and the back.

Specific descriptions are given below on embodiments of the present invention with reference to the drawings.

Embodiment 1

Figure 1B:
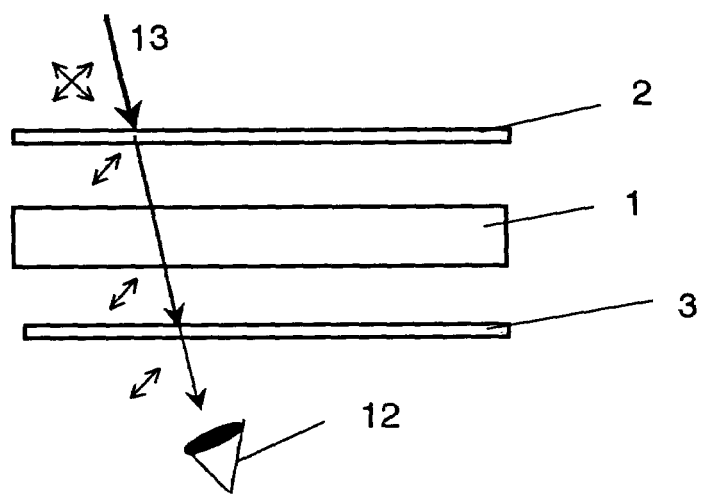

A liquid crystal display device of this embodiment is described referring to FIGS. 1A and 1B.

As shown in the drawings, a liquid crystal panel 1 is interposed between a polarizer 2 and a reflection-polarizing plate 3. The liquid crystal panel 1 comprises a liquid crystal layer that is sandwiched between transparent substrates such as glass substrates and plastic substrates. Display electrodes provided on the transparent substrates apply a voltage to the liquid crystal molecules to display an image or text. Here, the polarizer has a function of absorbing a specific linear polarization component and transmitting other polarization components. The reflection-polarizing plate has a function of reflecting a specific linear polarization component and transmitting other polarization components. A viewpoint of a viewer on the side of the polarizer 2 is called a first viewpoint 11, whereas a viewpoint of a viewer on the side of the reflection-polarizing plate 3 is called a second viewpoint 12.

The operation principle of the thus structured liquid crystal display device is described taking as an example a case where light enters from the side of the polarizer 2. Of incident light 13 that enters from the side of the polarizer 2, a linear polarization component in the absorption axis direction of the polarizer 2 is absorbed as the incident light 13 passes through the polarizer 2, whereas the rest of the incident light 13 enters the display panel 1 (transmitted component). The polarization direction of the light that has reached the liquid crystal panel 1 is changed, in an off region (a region to which no voltage is applied) of the liquid crystal layer, in accordance with the twist angle of liquid crystal molecules. This light then exits the liquid crystal panel 1. On the other hand, light that travels in an on region (a region to which a voltage is applied) of the liquid crystal layer maintains the polarization direction of the incident light and exits the liquid crystal panel 1 without a change. Of this exit light, a polarization component that matches the reflection axis direction of the reflection-polarizing plate 3 is reflected by the reflection-polarizing plate 3, whereas other components pass through the reflection-polarizing plate 3. If the direction of the polarization axis of light that has passed through the off region of the liquid crystal panel 1 matches the direction of the reflection axis of the reflection-polarizing plate 3, the light that has passed through the off region of the liquid crystal panel 1 is reflected by the reflection-polarizing plate 3 and therefore reaches the first view point 11 but not the second view point 12 as shown in FIG. 1A. On the other hand, light that has passed through the on region of the liquid crystal panel 1 is transmitted through the reflection-polarizing plate 3 and reaches the second view point 12 as shown in FIG. 1B. Accordingly, when viewed from the first viewpoint 11, the off region is displayed bright and the on region is displayed dark, whereas the off region is displayed dark and the on region is displayed bright when viewed from the second viewpoint 12. By thus setting the polarization axis of light that has passed through the off region of the liquid crystal panel 1 parallel to the reflection axis of the reflection-polarizing plate 3, the liquid crystal display device displays positive display of total reflection mode when viewed from the first viewpoint and negative display of total transmission mode when viewed from the second view point. In this case, it is desirable to prevent light from entering the display device from the second viewpoint side.

If an image to be viewed from the first viewpoint is seen from the second viewpoint in the display device structured as above, the image is reversed in negative/positive and has mirror writing or upside-down letters, depending on in what direction the liquid crystal panel is viewed. Accordingly, in order to view the same image from both the first viewpoint and the second viewpoint, a driver circuit for driving the liquid crystal panel 1 has to have a function of subjecting, before a signal is supplied to the liquid crystal panel, the signal to processing that changes the scanning direction in accordance with from which of the first viewpoint and the second viewpoint the display panel is to be viewed.

Figure 2:
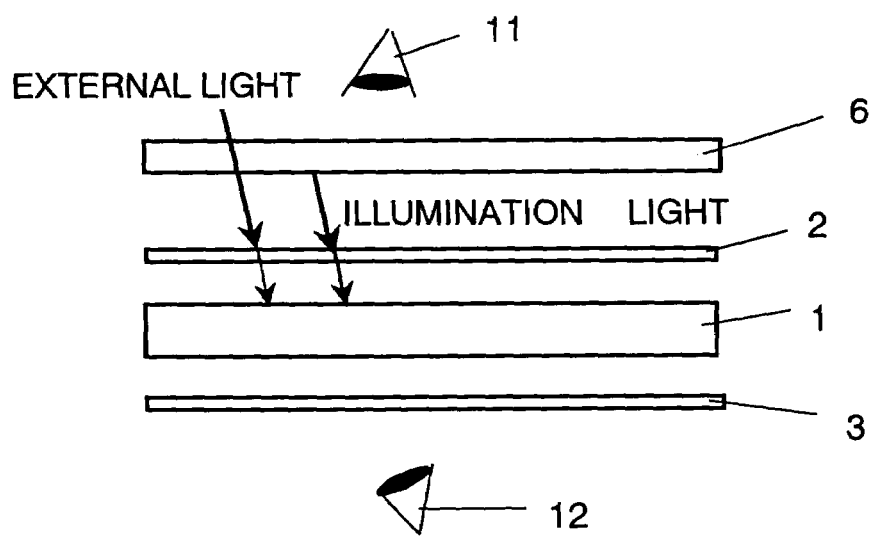
FIG. 2 is a sectional view schematically showing a structure of a liquid crystal display device with a light unit according to the present invention.

As shown in FIG. 2, the liquid crystal display device may have a front light type light unit 6 above the polarizer 2, so that display is made visible without external light that enters from the first viewpoint side. Here, the front light type light unit 6 has a function of transmitting light upward and downward as well as irradiating the liquid crystal panel 1 with illumination light. That is, the light unit 6 has a transmission function for transmitting external light that enters from the side of the first viewpoint 11 and for guiding the light to the liquid crystal panel and a light emission function for emitting illumination light from a built-in light source toward the liquid crystal panel. The transmission function is utilized in an environment where external light of enough brightness is available. The light emission function is utilized in an environment where external light of enough brightness is unavailable.

Embodiment 2

Figure 3:
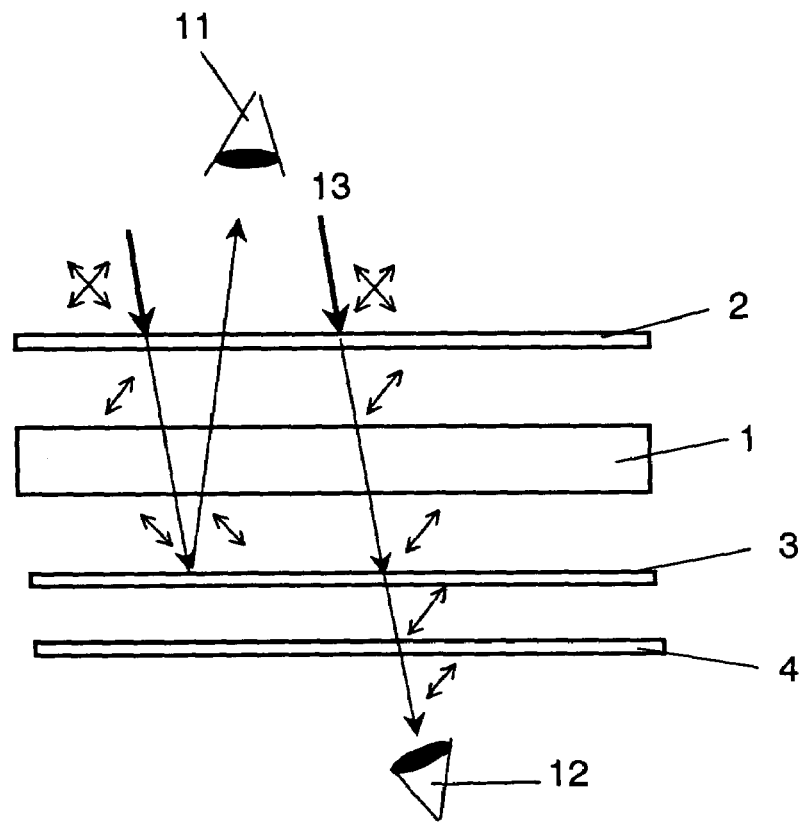
FIG. 3 is a schematic sectional view showing a liquid crystal display device of Embodiment 2 according to the present invention.

A liquid crystal display device of this embodiment is described referring to FIG. 3. Similar to Embodiment 1, the example is one where light enters from the side of the polarizer 2. The points that have already been described in Embodiment 1 will not be repeated.

In this embodiment, the liquid crystal panel 1 is interposed between the polarizer 2 and a second polarizer 4, and the reflection-polarizing plate 3 is placed between the liquid crystal panel 1 and the second polarizer 4 as shown in the drawing. Here, the reflection axis of the reflection-polarizing plate 3 is set parallel to the polarization axis of light that has passed through the off region of the liquid crystal panel 1. Also, the reflection axis of the reflection-polarizing plate 3 is in the same direction as the absorption axis of the second polarizer 4.

When the display panel is viewed from the first viewpoint, the description in Embodiment 1 applies to this embodiment and therefore is omitted.

When the structure that does not have the second polarizer 4 (namely, the structure of Embodiment 1) is viewed from the second view point side, light that enters from the second view point side is undesirable because its light (component) in the reflection axis direction of the reflection-polarizing plate 3 is reflected by the reflection-polarizing plate toward the second view point side. In other words, reflected light from the off region of the liquid crystal panel 1 that is displayed dark from the second view point reaches the second view point, thus affecting the visibility of a dark portion from the second view point.

This embodiment has the second polarizer 4 whose absorption axis is in the same direction as the reflection axis of the reflection-polarizing plate 3, and therefore a light component that is to be reflected by the reflection polarizing plate 3 toward the second viewpoint side is absorbed by the second polarizer 4 beforehand. This makes it possible to eliminate light reflected toward the second view point side by the off region of the liquid crystal panel 1 that is displayed dark when viewed from the second view point. Obtained as a result is an effect of improving display visibility from the second viewpoint side even when there is light that enters from the second viewpoint side.

Similar to Embodiment 1, the liquid crystal display device of this embodiment may have a front light type light unit above the polarizer 2. As a result, display is made visible from either viewpoint even in a dark environment.

Embodiment 3

Figure 4:
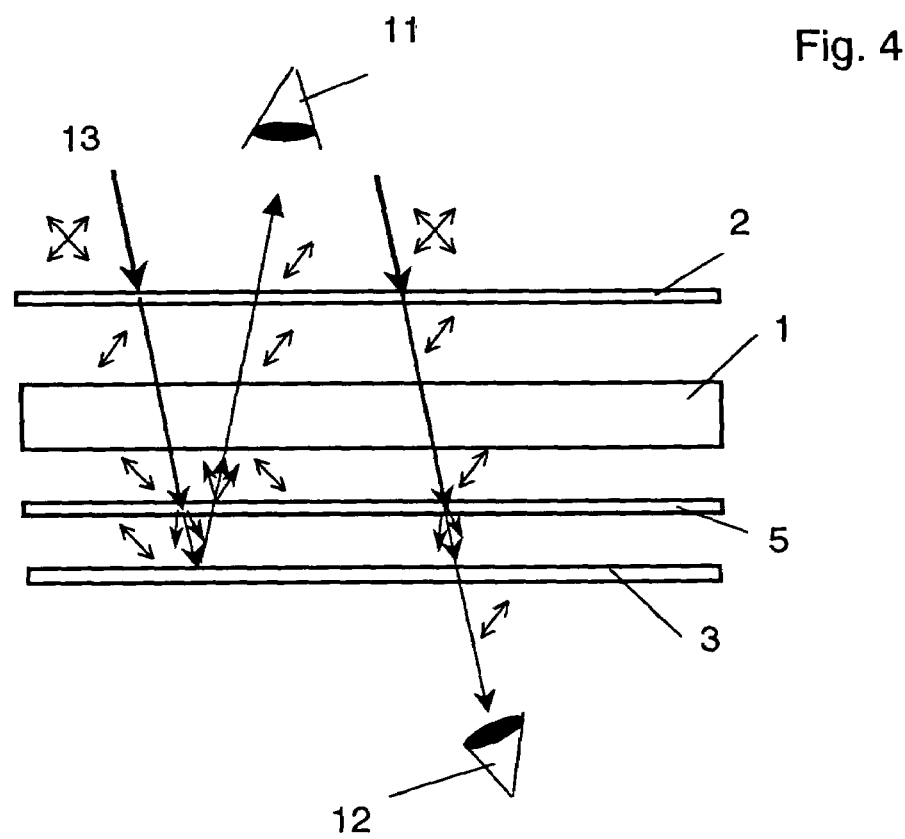
FIG. 4 is a schematic sectional view showing a liquid crystal display device of Embodiment 3 according to the present invention.
Figure 5:
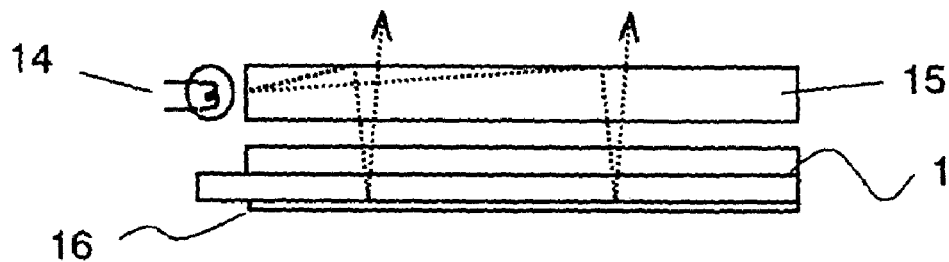
FIG. 5 is a sectional view schematically showing a structure of a conventional liquid crystal display device that has a front light.
Figure 6:
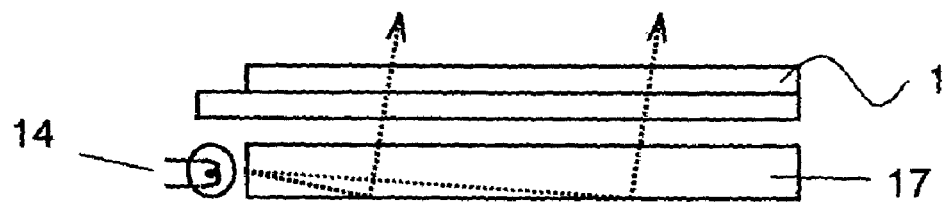
FIG. 6 is a sectional view schematically showing a structure of a conventional liquid crystal display device that has a back light.
Figure 7:
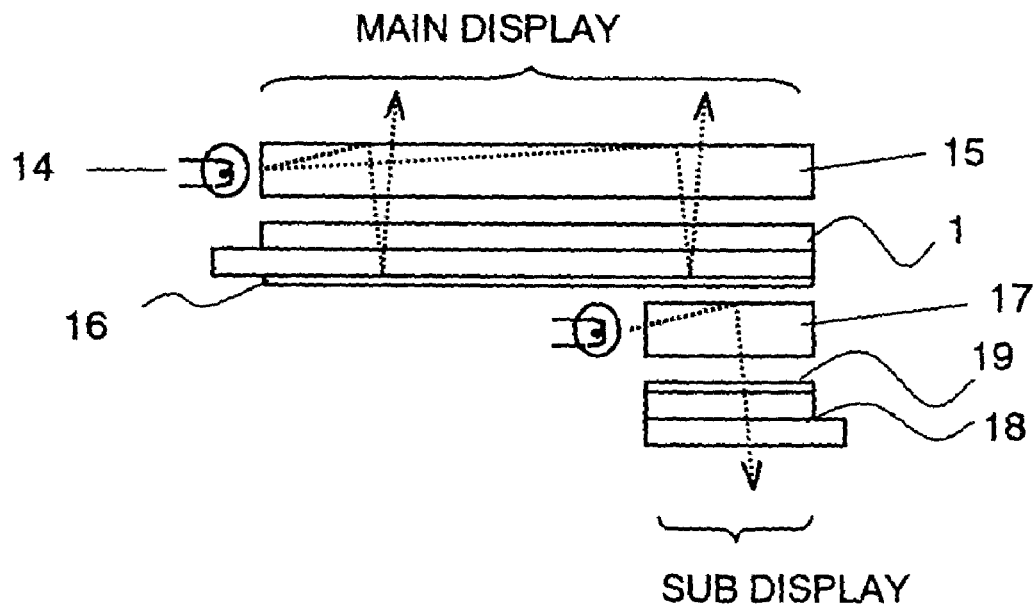
FIG. 7 is a sectional view schematically showing a structure of a conventional liquid crystal display device capable of main display and sub display.

A liquid crystal display device of this embodiment is described referring to FIG. 4. Similar to the above embodiments, the example is one where light enters from the side of the polarizer 2. The points that have already been described in the above embodiments will not be repeated.

In this embodiment, the liquid crystal panel 1 is interposed between the polarizer 2 and a reflection-polarizing plate 3, and a diffusion layer 5 is placed between the liquid crystal panel 1 and the reflection-polarizing plate 3 as shown in the drawing. Here, the reflection axis of the reflection-polarizing plate 3 is set parallel to the polarization axis of light that has passed through the off region of the liquid crystal panel 1. Also, the diffusion layer has a function of scattering light in a specific region when the light is transmitted through the diffusion layer.

With such diffusion layer, light scattered by the diffusion layer 5 is reflected by the reflection-polarizing plate and reaches the first viewpoint which may not be in the specular reflection direction of the angle of incident of the incident light 13. Therefore, the viewing angle is widened for a viewer at the first viewpoint. The viewing angle is widened also for a viewer at the second view point because light scattered by the diffusion layer 5 travels through the reflection-polarizing plate 3 and reaches the second view point which may not be on a straight line that is extended from the angle of incident of the incident light 13.

Accordingly, reflected components or transmitted components scattered in various directions by the diffusion layer and by the reflection-polarizing plate widen the viewing angle of a viewer irrespective of a change in angle of incident of the incident light 13 or a change in view point of a viewer (namely, a change in relative position between the angle of incident of incident light and a viewer).

Similar to Embodiment 1, the liquid crystal display device of this embodiment may have a front light type light unit above the polarizer 2. As a result, display is made visible from either viewpoint even in a dark environment.

Embodiment 4

Figure 8:
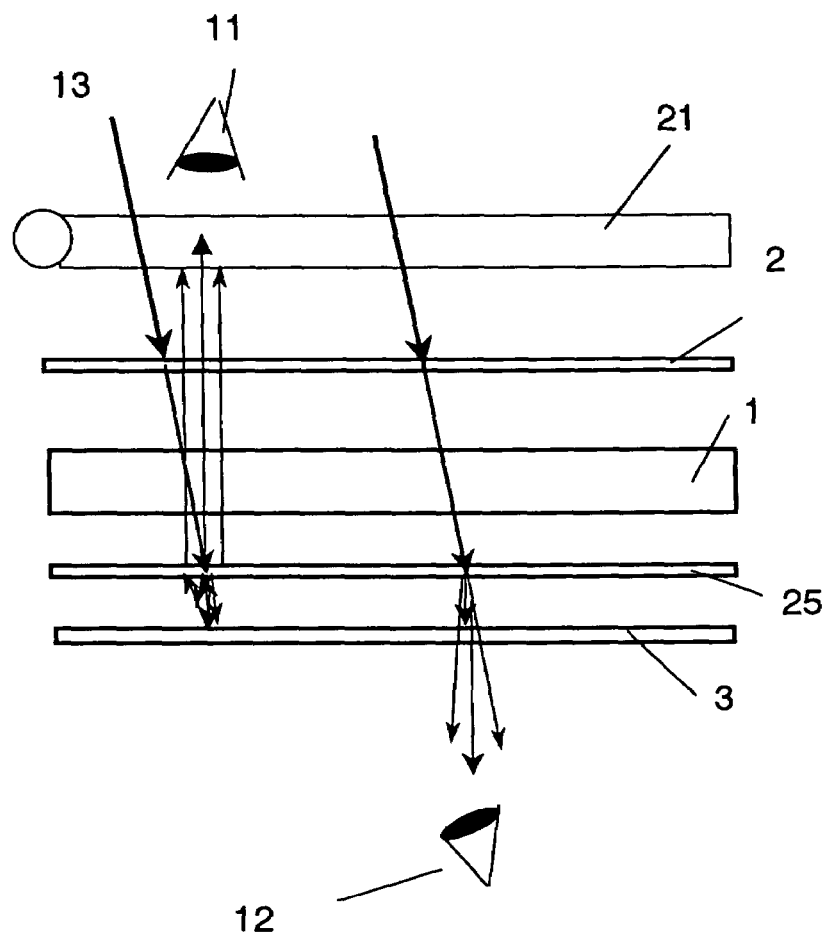
FIG. 8 is a schematic sectional view showing a liquid crystal display device of Embodiment 4 according to the present invention.

A liquid crystal display device of this embodiment is described referring to FIG. 8. In this embodiment, an example is given where a directional diffusion layer is provided instead of a diffusion layer. Similar to the above embodiments, the description takes as an example a case where a light enters from the side of the polarizer 2. The points that have already been described in the above embodiments will not be repeated.

Figure 9:
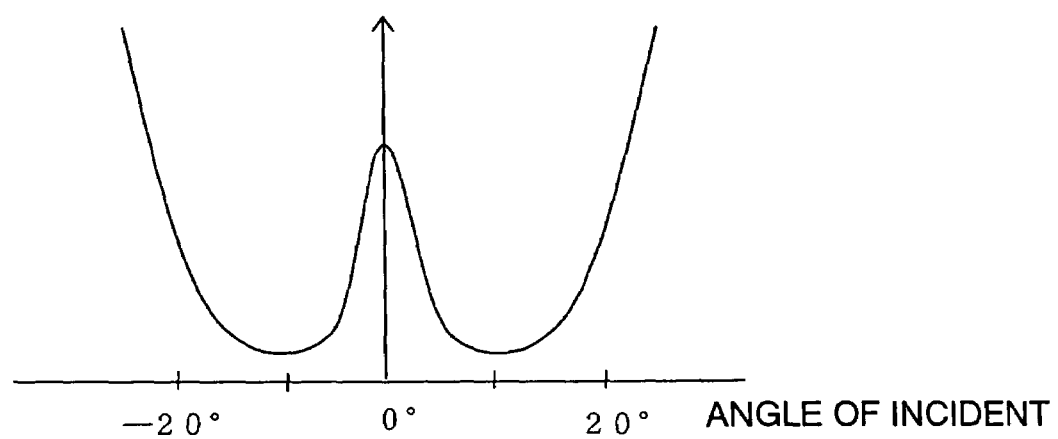
FIG. 9 is a graph showing a characteristic of a directive diffusion layer used in the present invention.

In this embodiment, the liquid crystal panel 1 is interposed between the polarizer 2 and the reflection-polarizing plate 3, and a directional diffusion layer 25 is placed between the liquid crystal panel 1 and the reflection-polarizing plate 3 as shown in the drawing. The liquid crystal panel is provided with a front light 21 for radiating illumination light as shown in the drawing. Here, the reflection axis of the reflection-polarizing plate 3 is set parallel to light that has passed through the off region of the liquid crystal panel 1. The directional diffusion layer 25 has a function of scattering light that enters at an angle within a specific angle range and directing the scattered light in a specific direction. According to characteristics of the directional diffusion layer 25, incident light from the thickness direction (the normal line direction) is mostly transmitted, and light having an angle of incident of 5 to 15 degrees is scattered and efficiently gathered in the thickness direction, namely, in front of a viewer, whereas light having an angle of incident of 20 degrees, which is the critical angle, or more is mostly transmitted. This makes it possible to view at the first viewpoint 11 the incident light 13 of various incident angles and the brightness is improved. FIG. 9 shows the relation between the angle of incident and the transmittance of the directional diffusion layer. In FIG. 9, the angle of incident of light that enters the directional diffusion layer from the thickness direction (the normal line direction) is 0 degree.

Now, a case of viewing the display from the first viewpoint 11 is considered. To obtain a better view of display with external light, the directional diffusion layer should have an excellent reflection characteristic. It is therefore preferable to use a directional diffusion layer that is small in transmittance and large in scattering ability. On the other hand, when the front light is put into use, a better view of display is obtained by using a directional diffusion layer that is large in transmittance and small in scattering ability.

In the case where the display is viewed from the second viewpoint 12, on the other hand, the directional diffusion layer is required to have an excellent transmission characteristic. A directional diffusion layer that is large in transmittance and small in scattering ability is thus preferred. The use of a directional diffusion layer having such characteristics is also helpful in avoiding blurred display.

In each of the drawings illustrating the above embodiments, optical elements such as the polarizer and the reflection-polarizing plate are separated from other structural components. However, the optical elements may be joined to the liquid crystal panel and other structural components by an adhesive.

According to a liquid crystal display device of the present invention, a single liquid crystal panel can be viewed both from the front side and from the back side to thereby allow the display device to be thinner. In addition, the viewing angle can be widened on either side of the display device by placing a diffusion layer between the liquid crystal panel and the reflection-polarizing plate. Moreover, a second polarizer placed outside the reflection-polarizing plate improves the visibility of display viewed from the second viewpoint.

What is claimed is:

1. A liquid crystal display device for displaying information viewable by an observer from opposite sides of the device using incident light incident from only one of the sides, the liquid crystal display device comprising: a liquid crystal panel having two opposing substrates and a liquid crystal layer interposed between the two opposing substrates, the liquid crystal panel being driven during use of the liquid crystal display device to change the direction of polarization of polarized light passing therethrough at selected regions thereof to produce display information; a polarizer disposed over a first side of the liquid crystal panel for polarizing incident light incident thereon; and only one reflection-polarizing plate which is disposed over a second side of the liquid crystal panel opposite the first side for receiving polarized incident light exiting the liquid crystal panel; wherein incident light polarized by the polarizer and transmitted through the liquid crystal panel while undergoing a change in direction of polarization is reflected by the reflection-polarizing plate back through the liquid crystal panel and the polarizer to enable an observer to view the display information from the first side of the liquid crystal panel; and wherein incident light polarized by the polarizer and transmitted through the liquid crystal panel without undergoing a change in direction of polarization is transmitted through the reflection-polarizing plate to enable an observer to view the display information from the second side of the liquid crystal panel.

2. A liquid crystal display device according to claim 1; wherein the reflection-polarizing plate reflects a polarization component of light that is polarized in a specific direction and transmits other polarization components of the light, and the reflection-polarizing plate has a reflection axis set in the same direction as at least one of (1) a polarization direction of light that exits the liquid crystal panel after a polarization direction of the light has been changed by the liquid crystal layer, and (2) a polarization direction of light that exits the liquid crystal panel without having being changed in polarization direction by the liquid crystal layer.

3. A liquid crystal display device according to claim 2; further comprising a second polarizer provided over the reflection-polarizing plate and having an absorption axis that is in the same direction as the reflection axis of the reflection-polarizing plate.

4. A liquid crystal display device according to claim 2; wherein incident light that travels through ON regions of the liquid crystal layer maintains the polarization direction of the incident light and exits the liquid crystal panel without a change in polarization direction, and a polarization component of the exit light that matches the reflection axis of the reflection-polarization plate is reflected by the reflection-polarizing plate, whereas other components of the exit light pass through the reflection-polarizing plate.

5. A liquid crystal display device according to claim 4; wherein, if the direction of the polarization axis of incident light that has passed through OFF regions of the liquid crystal layer matches the direction of the reflection axis of the reflection-polarizing plate, the light that has passed through the OFF regions of the liquid crystal layer is reflected by the reflection-polarizing plate and reaches the first side but not the second side, whereas incident light that has passed through the ON regions of the liquid crystal layer is transmitted through the reflection-polarizing plate and reaches the second side.

6. A liquid crystal display device according to claim 5; wherein, as viewed from the first side, the OFF regions of the liquid crystal layer produce a bright display and the ON regions of the liquid crystal layer produce a dark display, whereas, as viewed from the second side, the OFF regions of the liquid crystal layer produce a dark display and the ON regions of the liquid crystal layer produce a bright display.

7. A liquid crystal display according to claim 5; wherein the polarization axis of light that has passed through the OFF regions of the liquid crystal layer is set parallel to the reflection axis of the reflection-polarizing plate, so that the liquid crystal display device displays a positive display of a total reflection mode when viewed from the first side and a negative display of a total transmission mode when viewed from the second side.

8. A liquid crystal display according to claim 1; further comprising a diffusion layer interposed between the liquid crystal panel and the reflection-polarizing plate.

9. A liquid crystal display device according to claim 1; further comprising a directional diffusion layer interposed between the liquid crystal panel and the reflection-polarizing plate for scattering light entering thereinto which is within a specific angular range and transmitting light that enters thereinto that is outside the specific angular range.

10. A liquid crystal display device according to claim 9; wherein light scattered by the directive directional diffusion layer has directivity in a specific direction.

11. A liquid crystal display device according to claim 1; further comprising a front light unit provided over the polarizer for irradiating the liquid crystal panel with light.

12. A liquid crystal display device according to claim 1; further comprising a driver circuit for supplying a first set of driving signals to the liquid crystal panel to produce a given display when viewed from the first side and converting the driving signals to produce the given display when viewed from the second side.

13. A liquid crystal display device according to claim 1; wherein the polarizer absorbs a specific linear polarization component and transmits other polarization components.

14. A liquid crystal display device according to claim 1; wherein the reflection-polarizing plate reflects a specific linear polarization component and transmits other polarization components.

15. A liquid crystal display device according to claim 1; wherein the polarization direction of light that has reached the liquid crystal panel is changed in OFF regions of the liquid crystal layer in accordance with the twist angle of liquid crystal molecules of the liquid crystal layer.

16. A liquid crystal display device according to claim 1; wherein the polarization axis of polarized light passing through OFF regions of the liquid crystal layer is set parallel to the reflection axis of the reflection-polarizing plate so that the liquid crystal display device displays positive display information in a total reflection mode when viewed from the first side and displays negative display information in a total transmission mode when viewed from the second side.

* * * * *